United States Patent [19]

Oshita et al.

[11] Patent Number: 5,021,721
[45] Date of Patent: Jun. 4, 1991

[54] ELECTRIC POWER STEERING SYSTEM FOR A MOTOR VEHICLE

[75] Inventors: Saiichiro Oshita; Toyohiko Mouri; Tsutomu Takahashi, all of Tokyo, Japan

[73] Assignee: Fuji Jukogyo Kabushiki Kaisha, Tokyo, Japan

[21] Appl. No.: 441,261

[22] Filed: Nov. 27, 1989

[30] Foreign Application Priority Data

Nov. 30, 1988 [JP] Japan .................. 63-155849[U]

[51] Int. Cl.$^5$ .............................................. B62D 5/04
[52] U.S. Cl. ................................ 318/432; 180/79.1; 180/142; 318/489
[58] Field of Search .......................... 318/1-2, 318/9-12, 646, 432-433, 489, 488; 180/79.1, 142, 148

[56] References Cited

U.S. PATENT DOCUMENTS

| | | | |
|---|---|---|---|
| 3,983,953 | 10/1976 | Bayle | 180/79.1 |
| 4,522,278 | 6/1985 | Kitagawa et al. | 180/79.1 |
| 4,629,952 | 12/1986 | Shimizu | 318/489 X |
| 4,639,651 | 1/1987 | Shimizu | 318/489 X |
| 4,694,925 | 9/1987 | Roberts | 180/79.1 |
| 4,703,821 | 11/1987 | Shimizu | 180/79.1 |
| 4,739,855 | 4/1988 | Miyoshi et al. | 180/79.1 |
| 4,741,408 | 5/1988 | Bausch et al. | 180/79.1 |
| 4,756,376 | 7/1988 | Shimizu | 318/489 X |
| 4,773,498 | 9/1988 | Eto et al. | 180/79.1 |
| 4,865,143 | 9/1989 | Hashimoto et al. | 180/79.1 |

FOREIGN PATENT DOCUMENTS 60-188064  12/1985  Japan .

*Primary Examiner*—William M. Shoop, Jr.
*Assistant Examiner*—David Martin
*Attorney, Agent, or Firm*—Beveridge, DeGrandi & Weilacher

[57] ABSTRACT

An electric power steering system for an automobile which includes a steering shaft having a steering torque transmitting shaft. The electric power steering system includes a housing mounted on the steering torque transmitting shaft, a torsion torque sensor, in the housing, for detecting a torsion torque in the steering shaft during a steering operation to generate a torsion torque signal representing the detected torsion torque, and a controlling unit for providing a drive signal, in response to the torsion torque signal, to control an electric motor, mounted to the housing and operatively connected to the steering torque transmitting shaft, for reducing a steering effort. The controlling unit is integrally mounted to the housing.

6 Claims, 4 Drawing Sheets

ELECTRIC POWER STEERING SYSTEM FOR A MOTOR VEHICLE

BACKGROUND OF THE INVENTION

The present invention relates to an electric power steering system for an automobile.

A typical example of electric power steering systems has been proposed already in Japanese Utility Model Laid-open Publication No. 60 (1985)-188,064, for example, in which the front wheels are steered by transmitting the torque of a steering wheel shaft to a steering gear box assembly. In this known electric power steering system, the torque of an electric motor is transmitted to the steering wheel shaft through a freewheel clutch to reduce steering effort of the driver.

In such an electric power steering system, main parts of an assisting unit, such as the electric motor, an electromagnetic clutch and a torque sensor, are integrally mounted to the steering shaft, and these main parts are electrically connected to a control unit, which is mounted to a dashboard of the automobile, via cables and couplers.

The operation of this known electric power steering system cannot be tested until the control unit is connected to the main parts of the assisting unit by means of cables and couplers. Moreover, there is a possibility that the reliability of the electric power steering system decreases due to imperfect electrical contact.

It is an object of the present invention to overcome the disadvantages above described.

It is another object of the present invention to provide an electric power steering system which facilitates reduction in size thereof.

It is still another object of the present invention to provide an electric power steering system which facilitates mounting thereof to the automobile.

In view of these and other objects, the present invention provides an electric power steering system for an automobile having a steering shaft assembly with a steering torque transmitting shaft, comprising: a housing mounted on the steering torque transmitting shaft; a torsion torque sensor, provided in the housing, for detecting a torsion torque on the steering torque transmitting shaft during a steering operation to generate a torsion torque signal representing the detected torsion torque; an electric motor mounted on the housing and operatively connected to the steering torque transmitting shaft; and a controlling unit, integrally mounted to the housing and responsive to the torsion torque signal for providing a drive signal to control the electric motor so as to reduce steering effort.

DETAILED DESCRIPTION OF THE PREFERRED EMBODIMENT

Prior to the description of the preferred embodiments of the present invention, the known electric power steering system discussed before will be described briefly below for a better understanding of the background art and disadvantages thereof.

Figure 1:
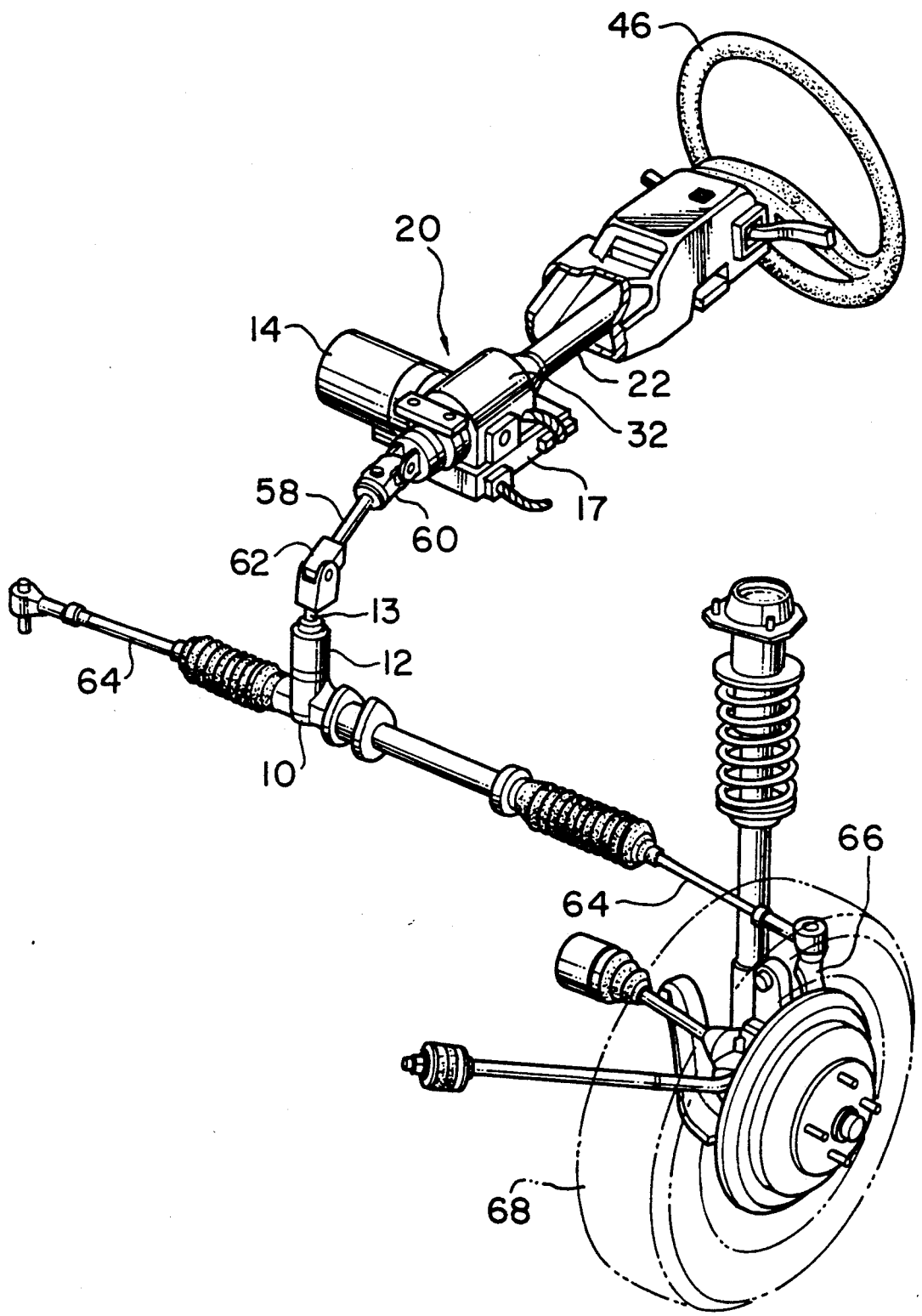
FIG. 1 is a perspective view of an electric power steering system according to the present invention.
Figure 2:
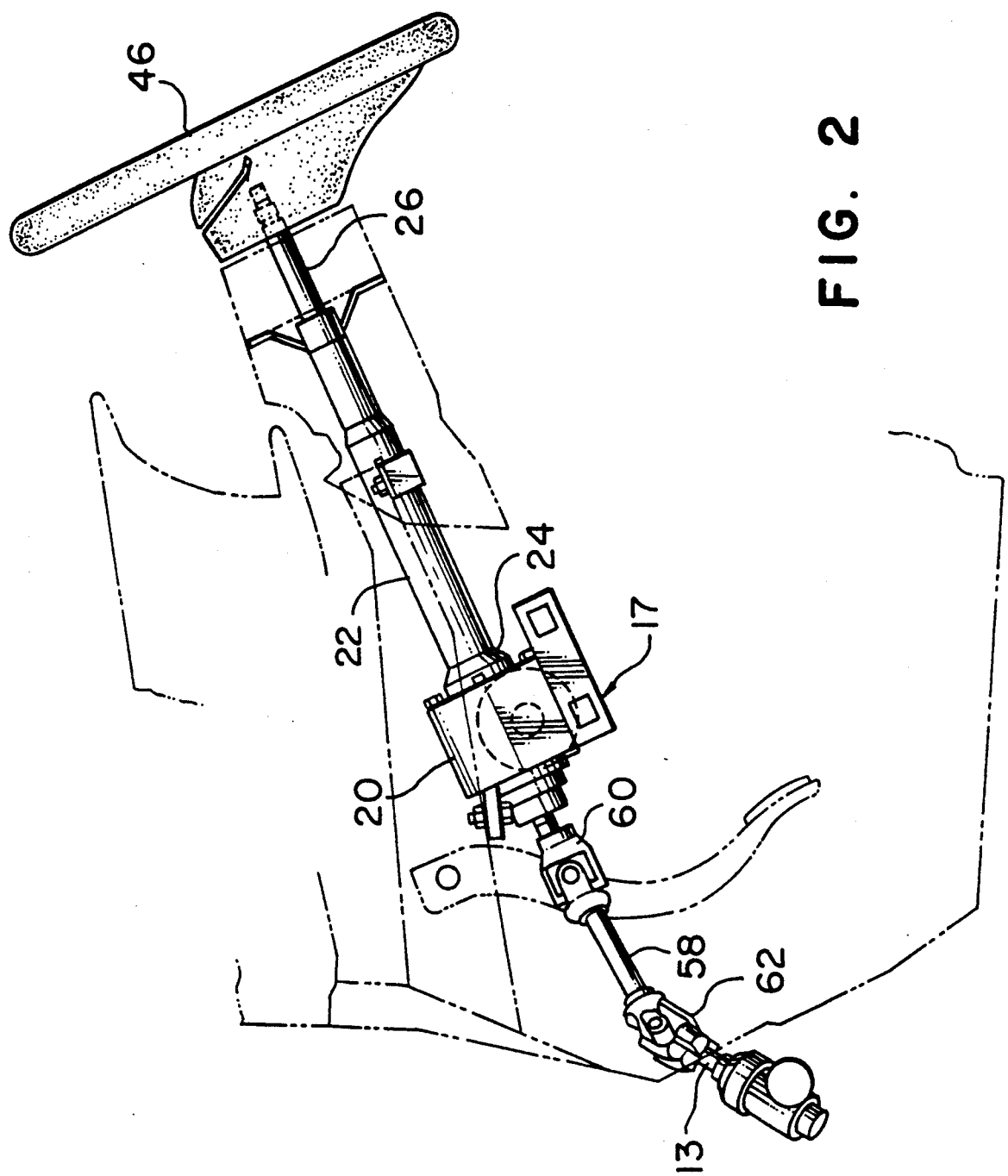
FIG. 2 is an enlarged side view of the electric power steering system of FIG. 1
Figure 5:
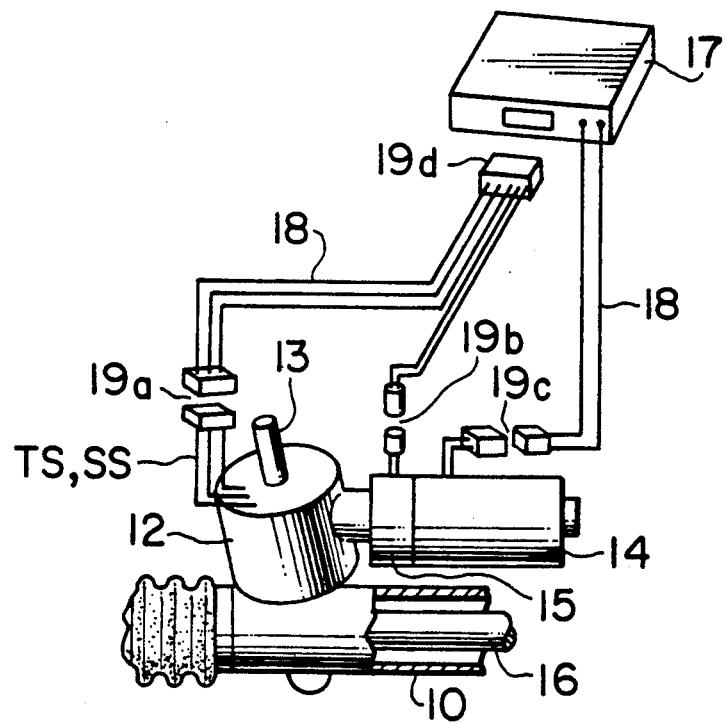
FIG. 5 is a view showing the assisting unit of the electric power steering system according to the prior art.

A typical example of the assisting unit of the electric power steering system of the prior art is illustrated in FIG. 5, in which reference numeral 10 designates a hollow cylindrical steering gear box. A rack shaft 16 is axially movably mounted into the steering gear box 10. Each of opposite ends of the rack shaft 16 is connected to a corresponding front wheel 68 through both a tie rod 64 and a steering arm 66 (as shown in FIG. 1). A hollow cylindrical pinion housing 12 is integrally formed with one end portion of the steering gear box 10. The pinion housing 12 covers and rotatably supports a pinion shaft 13. Although not shown, a pinion, a worm wheel, and movable parts of both a torsion torque sensor and a steering angle sensor are mounted on the pinion shaft 13 in the pinion housing 12. The fixed parts of both the torsion torque sensor and the steering angle sensor are mounted to the pinion housing 12. The worm wheel meshed with a worm (also not shown), which is connected to an electric motor 14 through an electromagnetic clutch 15. The worm and the worm wheel constitute a reduction gear mechanism of the electric motor 14. The pinion shaft 13 is rotated by the electric motor 14 through the clutch 15 and the reduction gear mechanism. The pinion shaft 13 is coupled to a steering shaft, having a steering wheel, through a joint. The pinion shaft 13 is rotated by the steering wheel.

A control unit 17 is mounted to a dashboard and is electrically connected to the torsion torque sensor, the steering angle sensor, the electric motor 14 and the clutch 15 through extension cables 18 and couplers 19a–19d. The steering torque, detected by the torsion torque sensor, and the direction of the steering, sensed by the steering angle sensor, are transmitted to the control unit 17. The output of the electric motor 14 is variably controlled by the control unit 17 so that a power assist in the steering direction is achieved by the electric motor 14 in response to the steering torque. When the steering torque becomes zero during returning of the steering wheel, the clutch 15 is disengaged to remove the influence on steering due to the inertia force of the electric motor 14.

In the known electric power steering system, extension cables 18 and couplers 19a–19d are used for transmitting signals between the control unit 17 and the other main parts of the assisting unit. Thus, there is a problem that the control of the control unit 17 may not be accomplished when breaking of extension cables 18, or separation or imperfect electric contact of couplers 19a–19d takes place.

Figure 3:
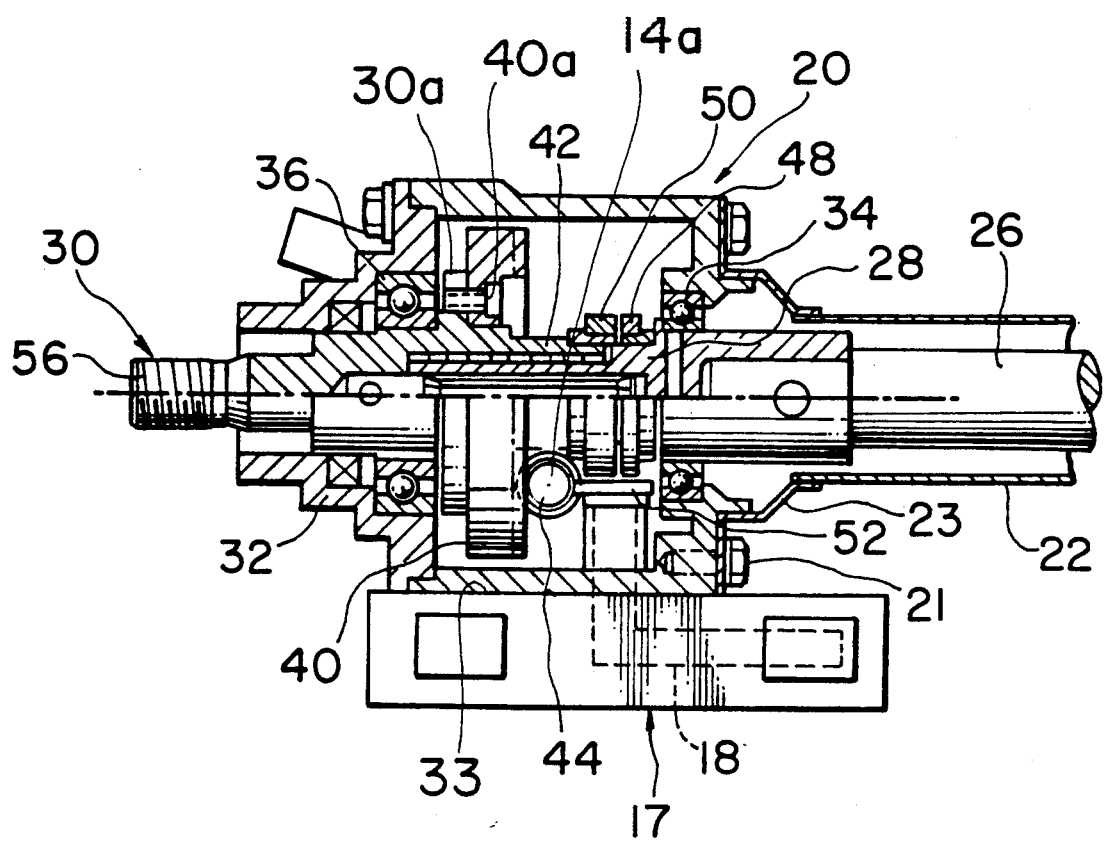
FIG. 3 is a view taken along the line III—III in FIG. 4.
Figure 4:
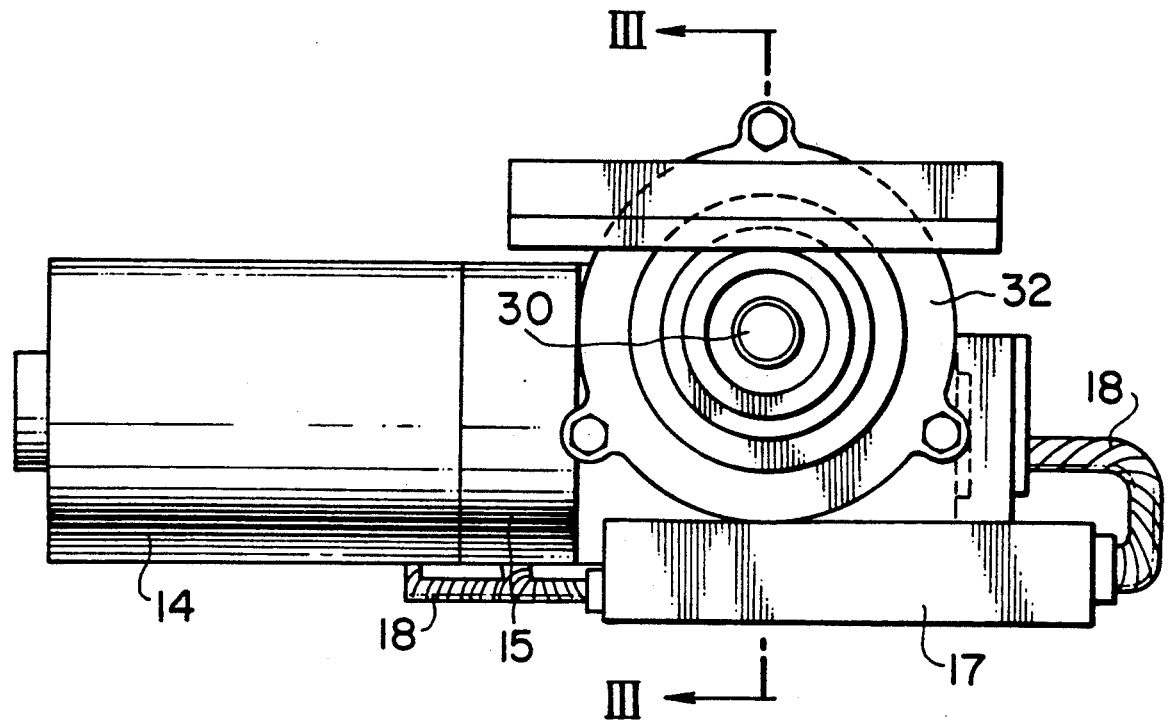
FIG. 4 is an enlarged front view of the assisting unit in FIG. 1.

One embodiment of the present invention is illustrated in FIGS. 1 to 4, in which like reference numerals which have been used in FIG. 5 indicate corresponding parts throughout views and descriptions thereof are omitted. In this embodiment, an assisting unit 20 is fastened to a lower end 23 of a steering column 22 by means of machine screws 21, 21 . . . .. A steering shaft 26 is provided in the steering column 22. A stub shaft 30 is coaxially joined at its upper end portion 42 to a lower end portion 28 of the steering shaft 26 through a serration joint, and the steering shaft 26 and the stub shaft 30 are rotatably supported on a housing 32 by ball bearings 34 and 36, respectively. A worm wheel 40 is mounted around the upper end portion 42 of the stub shaft 30 and secured to a flange 30a thereof by bolts 40a motor 14 via clutch 15 so as to be rotated for steering by a steering wheel 46. The electric motor 14 and the clutch 15 are mounted to the housing 32. A steering wheel side magnetic drum 48 and a front wheel side magnetic drum 50 are mounted around the lower end portion 28 of the steering shaft 26 and the upper end portion 42 of the stub shaft 30 in an opposing manner, respectively. Each of the steering wheel side magnetic drum 48 and the front wheel side magnetic drum 50 has north and south poles alternatively provided to the outer circumferential surface thereof. A pickup 52 is mounted to the housing 32 adjacent to the steering wheel side magnetic drum 48 and front wheel side magnetic drum 50 and is electrically connected to the control unit 17 through a cable 18. The pickup 52 detects the rotation of the steering wheel side magnetic drum 48 and front wheel side magnetic drum 50 by sensing the north and south poles. A torsion torque produces a difference in steering angle between the steering wheel side magnetic drum 48 and the front wheel side magnetic drum 50, thus producing a difference in phase between the signals detected by the pickup 52. A control unit 17 is mounted to the housing 32 in direct contact manner and, in this embodiment, the control unit 17 is welded to the housing 32 at 33 as shown in FIG. 3. The control unit 17 determines the torsion torque according to the difference in phase between signals provided by the pickup 52 via cable 18. Then, the control unit 17 controls the electric motor 14 according to the torsion torque detected for reducing a steering effort in the same fashion as in the assisting unit in FIG. 5. The stub shaft 30 is joined at its lower end 56 to torque rod 58 through universal joint 60 and the torque rod 58 is joined to the pinion shaft 13 through another universal joint 62.

In this embodiment, the control unit 17 is integrally mounted to the housing 32 which incorporates the reduction gear mechanism of the electric motor 14. Thus, the whole assisting unit 20 is mounted as a unit to the steering system. This construction has the following advantages. First, the whole assisting unit 20 can be tested as a unit about the performance and the reliability thereof, thus preventing deterioration in quality thereof. Second, the extension cables 18 and the couplers 19a-19d may be omitted. This enhances reliability of the assisting unit 20 and reduces the cost thereof. Third, the heat of the control unit 17 is directly transmitted to the housing 32 and hence any heat radiating member, such as a radiating fin, is not needed, and the assisting unit 20 is reduced in size. Lastly, the mounting of the assisting unit 20 to the automobile is facilitated.

In this embodiment, the control unit 17 is integrally mounted to the housing 32, which is joined to the lower end 23 of the steering column 22, but the control unit 17 may be attached to the pinion housing 12 of FIG. 5.

The torsion torque sensor of this embodiment includes the steering wheel side magnetic drum 48 and front wheel side magnetic drum 50 and the pickup 52, and the control unit 17 detects the direction of steering according to the polarity of the signals provided by the torsion torque sensor. In addition to the torsion torque sensor, a steering angle sensor which senses the direction of the steering may be used.

The present invention may be applied to various types of electric power steering systems responsive to vehicle speed and engine speed. The vehicle speed responsive power steering system varies the power assist according to the speed of the automobile which is detected by a vehicle speed sensor, and the engine speed responsive power steering system provides the power assist in dependence of the engine speed detected by an engine speed sensor. In these cases, a cable which connects the control unit 17 to the vehicle speed sensor or the engine speed sensor is needed.

The present invention may be applied to an electric power steering system without any clutch 15. In the electric power steering system, the electric motor 14 is controlled to remove an influence due to its inertia force during returning of the steering wheel 46.

While the preferred embodiment of the present invention has been shown and described, it is to be understood that this disclosure is for the purpose of illustration and that various changes and modifications may be made without departing from the scope of the invention as set forth in the appended claims.

What is claimed is:

1. An electric power steering system for an automobile having wheels, a steering wheel, a steering shaft operatively connected to said steering wheel, a stub shaft coaxially jointed to an end of said steering shaft, a torsion torque sensor incorporated with said steering shaft and said stub shaft to detect a torsion torque in said steering shaft during a steering operation and to produce a corresponding torsion torque signal, a housing provided to house said torsion torque sensor and to rotatably mount said steering shaft and said stub shaft, an electric motor secured to said housing, a transmission mechanism provided to selectively connect said electric motor with said stub shaft to transmit rotation of said electric motor to said stub shaft, and means for steering said wheels in accordance with rotation of said stub shaft, comprises:
 a control unit integrally mounted on and secured to said housing and provided to produce a drive signal to control said electric motor in response to said torsion torque signal; and whereby easy and simple assembling of the system without additional couplers and enhanced reliability is obtained.

2. The system according to claim 1, further comprising cable to directly connect said control unit to said torsion torque sensor and to said electric motor, respectively.

3. The system according to claim 1, further comprises:
 a steering column provided around said steering shaft to secure said housing.

4. The system according to claim 1, wherein said control unit is secured to said housing by welding so as to perform the radiation of heat of said control unit without radiating means.

5. The system according to claim 1, wherein said torsion torque sensor comprises:
 a pair of magnetic drums mounted around respective opposing ends of both the steering shaft and the stub shaft, said drums including a periphery having north poles and south poles alternatively arranged; and
 a pickup provided to sense the north poles and the south poles to generate the torsion torque signal.

6. The system according to claim 1, wherein said transmission mechanism comprises:
 a shaft member disposed inside the housing;
 a clutch provided to selectively engage said shaft member with said electric motor;
 a worm secured around said shaft member; and
 a worm wheel secured to said stub shaft and meshed with said worm so as to assist the rotation of said stub shaft.

* * * * *